United States Patent [19]

Rieger et al.

[11] Patent Number: 4,840,399
[45] Date of Patent: Jun. 20, 1989

[54] ANTI-SKID DEVICES FOR MOTOR VEHICLES

[75] Inventors: Hansjörg W. Rieger, Aalen; Wolfgang Biehler, Aalen-Unterkochen, both of Fed. Rep. of Germany

[73] Assignee: Rud-Kettenfabrik Rieger & Dietz GmbH u.Co., Aalen, Fed. Rep. of Germany

[21] Appl. No.: 887,869

[22] Filed: Jul. 18, 1986

[30] Foreign Application Priority Data

Jul. 19, 1985 [DE] Fed. Rep. of Germany ....... 3526360

[51] Int. Cl.⁴ .............................................. B60C 27/00
[52] U.S. Cl. ..................................... 280/757; 152/208; 152/222; 188/48; 301/42
[58] Field of Search ............................ 280/757; 180/16; 152/20, 213 R, 214, 216, 221, 222, 223, 231, 232; 188/4 R, 4 B, 5, 6; 301/4 R, 42

[56] References Cited

U.S. PATENT DOCUMENTS

| | | | |
|---|---|---|---|
| 1,150,148 | 8/1915 | Putnam | 188/4 B |
| 1,223,070 | 4/1917 | Putnam | 188/4 B |
| 1,374,252 | 4/1921 | Thorne | 188/4 B |
| 1,381,001 | 6/1921 | Norman | 188/4 B |
| 2,241,923 | 5/1941 | Ridgway | 188/4 B |
| 2,264,466 | 2/1941 | Weisel | 188/4 B |
| 2,277,036 | 3/1942 | Chaussee | 188/4 B |
| 2,283,948 | 5/1942 | Ridgway | 188/4 B |
| 2,442,322 | 5/1948 | Daley | 188/4 B |
| 2,537,231 | 1/1951 | Necrason | 152/208 |
| 2,815,828 | 12/1957 | Schaefer | 188/4 B |
| 3,068,949 | 12/1962 | Sirois | 188/4 B |
| 4,054,304 | 10/1977 | Sirois | 152/222 |
| 4,299,310 | 11/1981 | Torneback | 152/208 |
| 4,621,712 | 11/1986 | Hardmark | 152/208 |
| 4,657,118 | 4/1987 | Anderson | 152/208 |

FOREIGN PATENT DOCUMENTS

| | | | |
|---|---|---|---|
| 163056 | 9/1948 | Austria | 188/4 B |
| 3433620 | 3/1984 | Fed. Rep. of Germany . | |
| 409260 | 4/1910 | France . | |

*Primary Examiner*—Charles A. Marmor
*Assistant Examiner*—Everett G. Diederiks, Jr.
*Attorney, Agent, or Firm*—Mark P. Stone

[57] ABSTRACT

In an anti-skid device for motor vehicles with a plurality of chain strands (2,3,4,5) retained in a support (1) which can be set into a revolving motion and connected to the latter by intermediate pieces (7) forming resilient spreading arms, the chain strands are combined to form chain strand groups (6) which consists of at least two chain strands. The chain strands (2,3,4,5) of the chain strand groups (6) are of fine-linked construction and connected to the intermediate pieces (7) by rings (23).

31 Claims, 6 Drawing Sheets

ANTI-SKID DEVICES FOR MOTOR VEHICLES

BACKGROUND OF THE INVENTION

The invention relates to an anti-skid device for motor vehicles with a plurality of chain strands retained by a support which can be set into a revolving motion and connected to the latter by intermediate pieces forming resilient spreading arms, of which the ends remote from the support are thrown away from the support by the effect of centrifugal force when the support revolves in the service position, and at least parts of which pass through the region of the ground contact surface of the tyre when the vehicle tyre rotates.

An anti-skid chain of the above-mentioned type, in which each intermediate piece is adjoined by an individual chain strand made of links of comparatively great nominal thickness, is known from German Offenlegungsschrift No. 2,914,366. Its advantage compared to customary anti-skid chains lies in the fact that it renders time-wasting chain assembly superfluous. The driver of a vehicle, particularly a commercial vehicle, can on the contrary transfer the anti-skid device from a rest position into a service position and vice versa without leaving the driving seat. The fact that the known anti-skid devices of similar construction have also found little adoption in practice is due particularly to the fact that their anti-skid characteristics are unsatisfactory. Thus, particularly at low vehicle speeds, there is no guarantee that anti-skid elements will pass in sufficient number to the region of the ground contact surface of the tyre. The tyre—one may say—"does not accept the chain strands". There is the further factor that the rolling comfort of the tyre is greatly impaired when the known device is used, and despite the use of resilient spreading arms its chain strands tend to so-called braiding, which proves to be extraordinarily critical here because the spreading arms consist of a core formed by a cable piece or a chain strand section and a resilient rubber envelope enclosing the latter, through which the connection of the spreading arms to the support is effected. In the case of braiding, but also in the case of normal service, the forces acting in the region of the connection points can in fact assume values which cannot be withstood by the rubber envelope anchorage.

A similarly constructed anti-skid device is also known from U.S. Pat. No. 3,068,949, wherein instead of chain strands, resilient spoke-like structures are used which are connected by metallic tension springs to the support. Although this device presents the advantage that its anti-skid elements are moved into the region of the ground contact surface of the tyre irrespectively of the centrifugal force exerted upon them, and the danger of braiding is eliminated with them, nevertheless its anti-skid characteristics are unsatisfactory. Furthermore, the resilient construction of the spokes themselves and their connection by a traction spring to the support triggers a whiplash effect when the spokes are released after passing over the tyre, which can lead to damage not only to consecutive spokes but also to parts of the vehicle.

Anti-skid devices with anti-skid elements formed by rigid or resilient spokes have moreover failed to find acceptance for the additional reason that it is quite impossible, or at best only possible by accepting a substantial structural outlay, to accommodate them compactly in the out-of-service position.

SUMMARY OF THE INVENTION

The underlying aim of the invention is to produce an anti-skid device of the type in question, which whilst maintaining chain strands which can be thrown outwards by a support as particularly tenacious anti-skid elements provides considerably improved anti-skid characteristics and rolling conditions compared to known relevant devices, whilst a prolonged service life of the chain strands and a simpler monitoring of their wearing behaviour is desired simultaneously.

This aim is achieved according to the invention when, in an anti-skid device of the type initially defined, chain strand groups comprising at least two chain strands engage at least some, but preferably all the intermediate pieces.

The anti-skid device according to invention presents a series of significant advantages. Due to the replacement of individual chain strands by chain strand groups which engage the support by connecting pieces forming the spreading arms, the chain strands can consist of smaller links than hitherto. However, fine-linked chain strands are easier to introduce into the wedge gap between tyre and road than coarse-linked chain strands. Simultaneously, a more uniform distribution of the gripping elements formed by the chain links across the ground contact surface of the tyre is achieved, and in this way not only the anti-skid effect, but also the rolling behaviour of the tyre are influenced positively. As has been ascertained by tests, the anti-skid device according to the invention adapts itself within certain limits to the circumferential forces to be transmitted to the tyres, inasmuch as a superimposition of chain strands of a chain strand group occurs during the transmission of major circumferential forces. Because the chain strands of the individual chain strand groups normally pass across the ground contact surface of the tyre approximately in fan shape, a kind of gradual wear occurs, that is to say, the first strand protects the following one or ones, which still have their full functional efficiency after the first strand is worn. Critical braiding is also largely prevented because the chain strands, which fan out in service, of the individual chain strand groups, counteract rotations of the groups and of the connecting pieces about a common axis. The resilient spreading arms guide the chain strand groups into the optimum entry position. Any disturbing whiplash effect on the emergence of the anti-skid elements from the rolling region of the tyre is prevented by the fact that the chain strands of the chain strand groups are not released abruptly at once from the tyre, but successively.

Particularly favorable conditions are obtained if the chain strand groups consist of three to five, preferably of four chain strands, and five to seven, preferably six, chain strand groups are distributed round the circumference of the support.

The links of the chain strands or chain strand groups are conveniently matched in size to the wedge gap between vehicle tyre and road, which is a function of the outside diameter of the vehicle tyre, in such a way that they are retained in the wedge gap by friction on a smooth road. Chain strands comprising links with a nominal thickness of 4 or 5 mm have proved to be highly successful in practice.

In a preferred embodiment of the invention the connecting pieces which form spreading arms consist of chain strand sections which are each enclosed by a helicoidal spring serving to stiffen them, the turns of which assume a mutual interval and which are constructed as compression springs pre-tensioned by the chain strand sections.

BRIEF DESCRIPTION OF THE DRAWINGS

Further particulars and features of the invention will emerge from the supporting sub-claims and from the description given below of a plurality of exemplary embodiments illustrated in the accompanying drawing, wherein:

The same reference numerals are used for parts of corresponding function in the Figures.

BEST MODE FOR CARRYING OUT THE INVENTION

Figure 1:
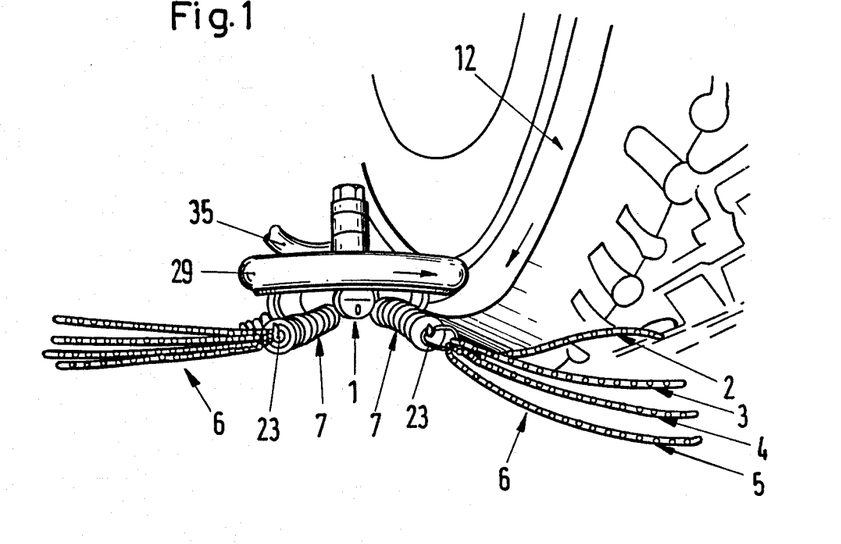
FIG. 1 shows the perspective view of an anti-skid device occupying the service position.
Figure 3:
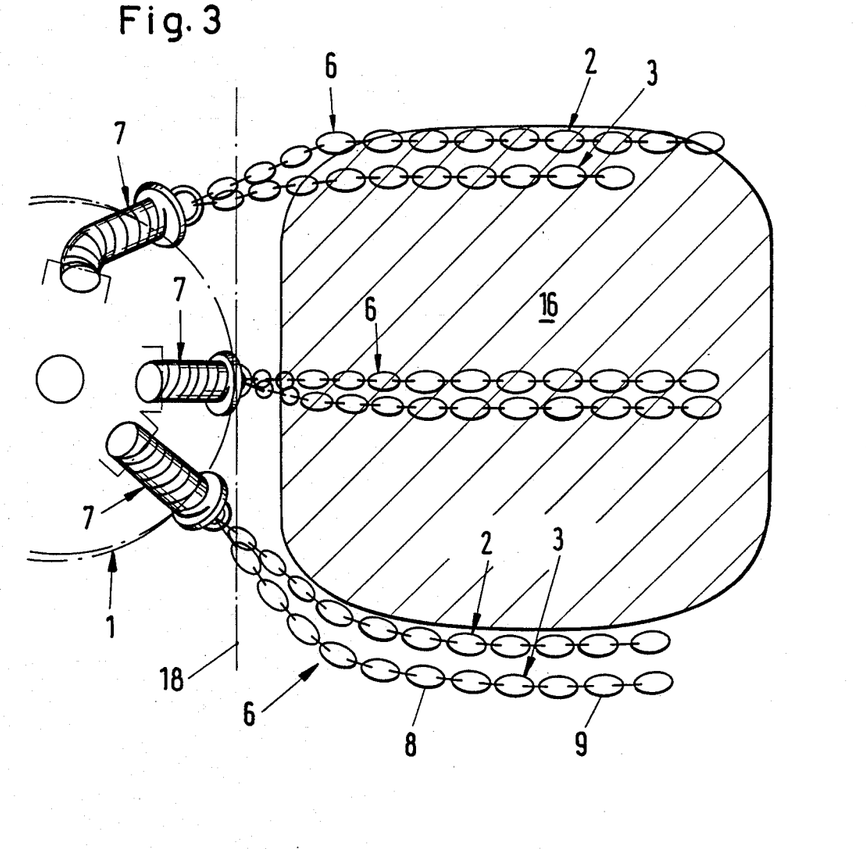
FIG. 3 shows diagrammatically the arrangement of the chain strand groups when passing over the ground contact surface of the tyre.
Figure 9:
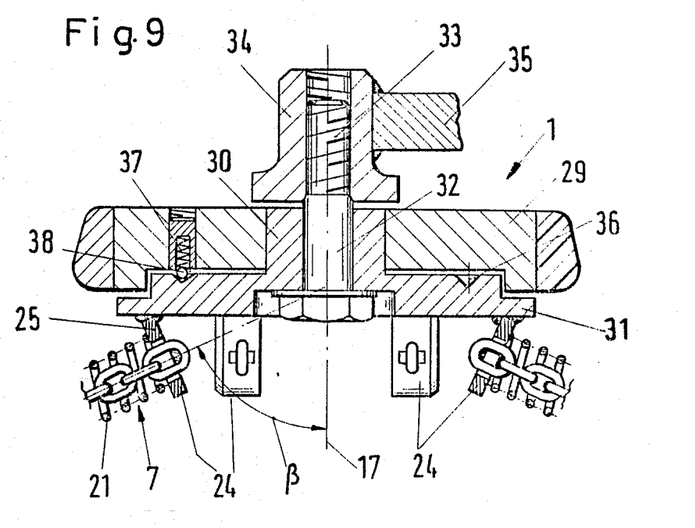
FIG. 9 shows a section through an anti-skid device with a slip coupling.
Figure 10:
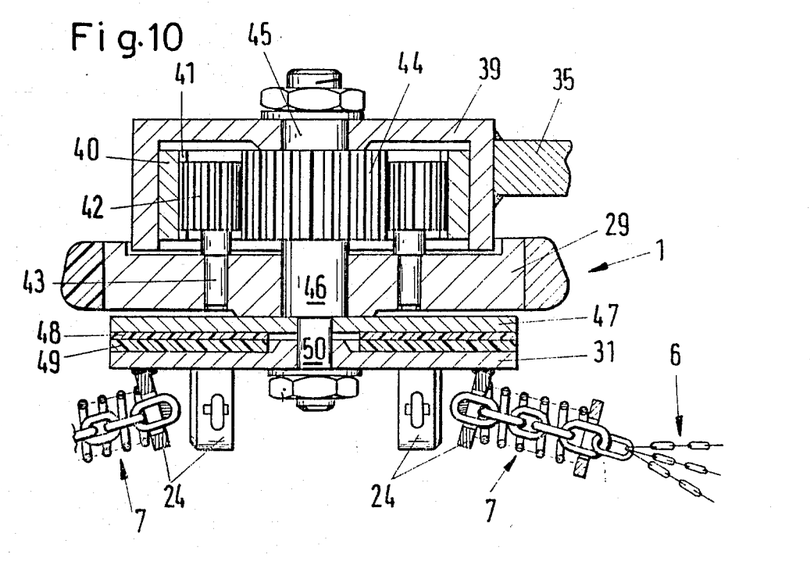
FIG. 10 shows a section through an anti-skid device equipped with a transmission gear and with a slip coupling.

In FIG. 1, 1 designates the support of an anti-skid device, which should be constructed as illustrated in FIGS. 9 and 10, which show particularly advantageous solutions. The support 1 exhibits six chain strand groups, generally designated as 6, distributed uniformly round its circumference, preferably each comprising four chain strands 2,3,4,5, of which only two are illustrated in FIG. 1. The individual chain strand groups 6 are connected to the support by intermediate pieces 7 forming resilient spreading arms. As indicated in FIG. 3, at the top, the chain strands 2 and 3 may be of unequal length, or as shown in FIG. 3 at the bottom, consist of links 8 and 9 of different dimensions, in which case the links 9 associated with the free ends of the chain strands 2 and 3 have smaller dimensions than the links 8 located nearer the support 1.

Figure 5:
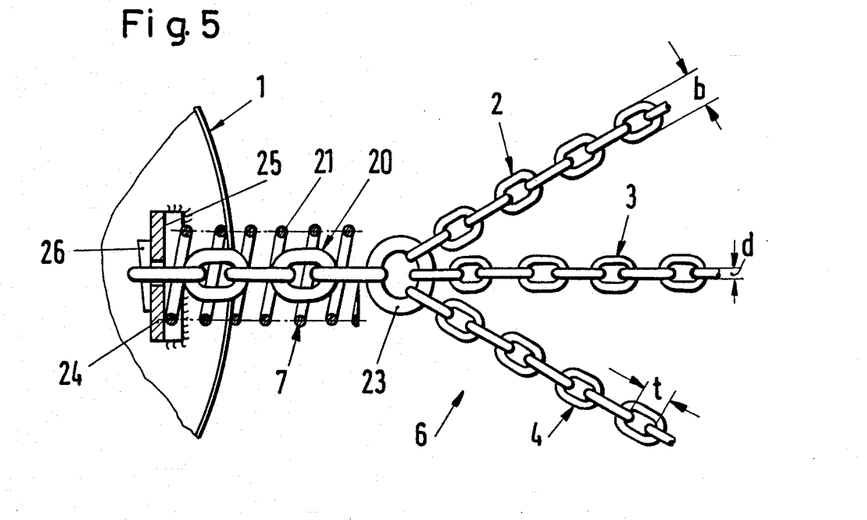
FIGS. 5–8 show partial plans of anti-skid devices with differently constructed intermediate pieces.
Figure 6:
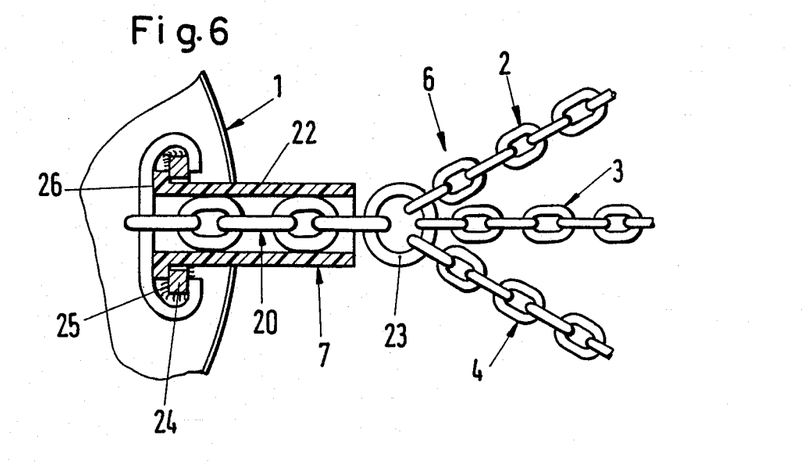

By the use of chain strands 2,3,4,5 or 2,3,4 or 2,3 combined in groups or bunches instead of individual chain strands, it is made possible to use chain links 8,9 of comparatively small dimensions, that it to say, chain links, the nominal thickness d of which should be a maximum of 5 mm, their outside width b at most equal to three and one half times the nominal thickness d, and their pitch t not more than equal to four times the nominal thickness d (cf FIG. 5).

Figure 4:
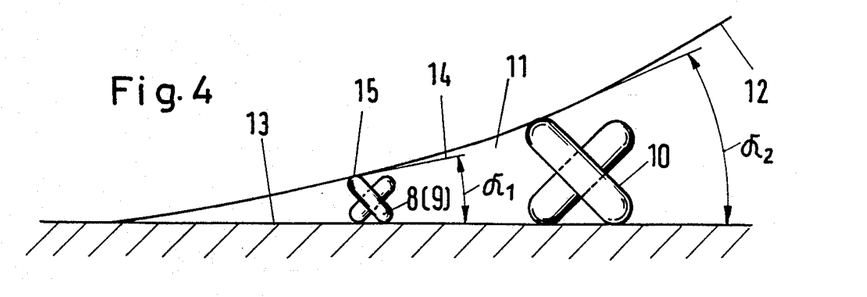
FIG. 4 shows chain links of different sizes in the wedge gap between vehicle tyre and road.

The advantage provided by the use of small links 8 or 9 compared to larger chain links 10 is clear from FIG. 4. In this Figure, 11 designates the wedge gap between the vehicle tyre 12 and the road 13. The angle $\alpha_1$ between the road 13 and the tangent 14 to the bracing point 15 of the links 8 or 9 on the vehicle tyre 12 is preferably 10°, whereas the corresponding angle $\alpha_2$ in the case of known constructions is approximately 25°. Now the coefficient of friction $\mu$ is equal to the tangent of the angle $\alpha_1$ or $\alpha_2$ respectively. Self-locking occurs when tan $\alpha < 2$ $\mu$. Because the coefficient of friction $\mu$ between steel and snow-covered road is 0.1, self-locking prevails in the case of $\alpha_1$, that is to say tan 10° equals 0.176 < 0.2, that is to say the chain strands are accepted by the tyre and transferred into the region of the ground contact surface 16 of the tyre 12 (cf FIG. 3). It follows from this discovery that it is convenient to construct the chain strands as indicated in FIG. 3, at the bottom, and as already described above. The links 8 with a greater gripping height are retained in the wedge gap 11 here by the smaller links 9, that is to say the smaller links 9 form anchors which prevent the chain strands 2,3,4,5 from flying off the tyre 12.

Figure 2:
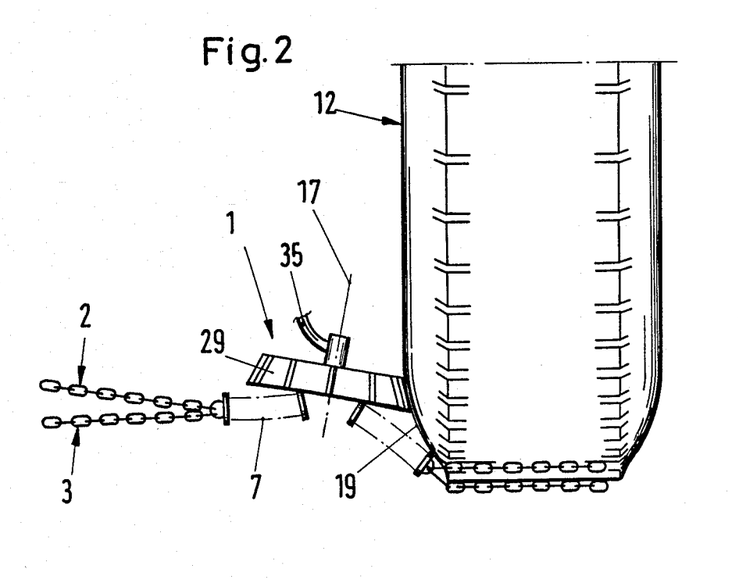
FIG. 2 shows diagrammatically the end elevation of an anti-skid device occupying the service position.

By virtue of the resilient intermediate pieces 7, it is achieved that the chain strands 2,3,4,5 are transferred into an optimum position relative to the tyre 12, whilst it is found favourable if the intermediate pieces 7 in their rest position assume an angle $\beta$ of 40°–80° to the axis of rotation 17 of the support 1 (cf FIG. 9) and extend into the immediate proximity of the vehicle tyre 12, as illustrated in FIG. 2. Due to the resilience of the intermediate pieces 7, they can bend upon the emergence of the chain strand groups 6 from the region of the ground contact surface 16 of the tyre (cf FIG. 3) and thus improve the exit behaviour of the chain strands. Their resilience also permits them to escape relative to the flanks 19 of the tyre 12 which are indicated by a chain-dotted line 18 in FIG. 3 (cf also FIG. 2).

Different constructions of the intermediate pieces 7 are illustrated in FIGS. 5–8. The important point in all the solutions shown is that the chain strand groups 6 are connected securely to the support 1. This is achieved by using intermediate pieces 7 which consist of chain strand sections 20 or other multi-membered structures connected directly to the support, and springs 21 or stiffening sleeves 22 enclosing the chain strand sections 20. Both the springs 21 and the stiffening sleeves 22 may be of cylindrical (cf FIGS. 5,6,7) or conical (cf FIG. 8) construction. Rings 23 are preferably used to connect the chain strand sections 20 to the chain strands 2,3,4,5. However, the use of plates with slots or a plurality of juxtaposed holes is also possible.

The springs 21 or stiffening sleeves 22 are braced against abutments 24 of the support by bracing surfaces 25 which are oriented obliquely to the axis of rotation 17 of the support 1 (cf FIG. 9). Locking members 26 serve for the secure anchorage of the intermediate pieces 7 to the support 1.

Figure 7:
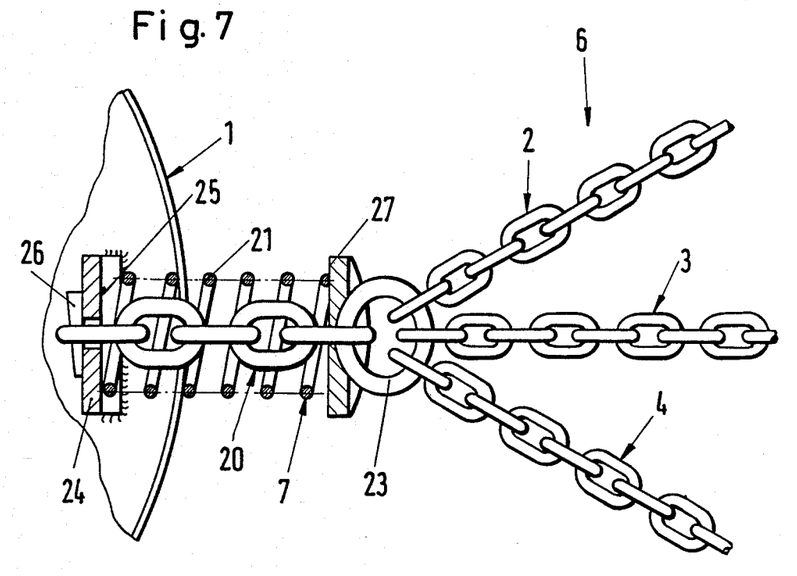
Figure 8:
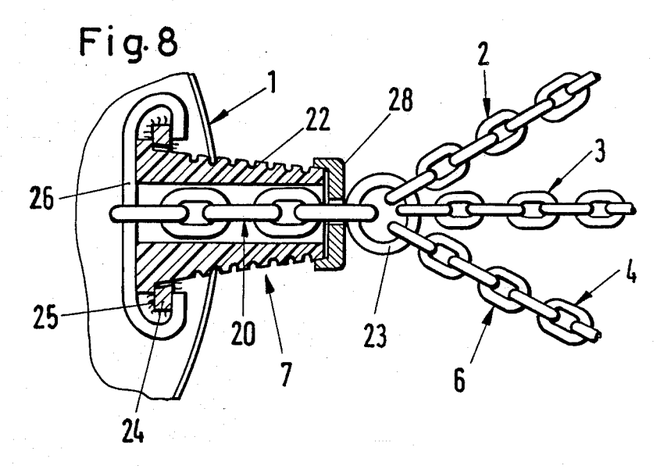

Intermediate pieces 7 of the type illustrated in FIGS. 7 and 8 have proved particularly advantageous for the spreading effect. In the exemplary embodiment according to FIG. 7 the spring 21 is pre-tensioned in compression by the chain strand section 20. For this purpose the ring 23 presses against a second abutment 27, between which and the first abutment 25 the spring 21 is arranged. The spreading behaviour of the intermediate piece can be adapted to the particular conditions by the pre-tensioning of the spring 21.

In the exemplary embodiment according to FIG. 8 a cap 28, which is arranged at the end of the stiffening sleeve 22, counteracts excessive stressing of the free end of the stiffening sleeve 22, by maintaining the end link of the chain strand section 20, which is connected to the ring 23, at an interval from the edge of the end of the stiffening sleeve 22.

FIG. 9 shows details of the construction of a first support 1. It consists of a bracing wheel or friction wheel 29, which is mounted rotatably on the lug 30 of a driving part 31, which is in turn mounted rotatably on a cylindrical section 32 of a stud 33 which is screwed into the bushing 34 of a pivot arm 35. The driving part 31 is provided with catch recesses 36 distributed round its circumference, into which one or more balls 38 subject to the influence of a compression spring 37 engage. The catch recesses 36, the compression springs 37 and the balls 38 form a slip coupling which permits relative movement between the driving part 31 and the bracing wheel or friction wheel 29, in case the torques transmitted by the chain strand groups 6 into the driving part 31 exceed a specific value.

A second support 1, particularly well suited for the drive of chain strand groups 6, is illustrated in FIG. 10. It again has a bracing wheel or friction wheel 29, which is mounted rotatably relative to a driving part 31. In this case a ring gear 40 with female tooth system 41 is arranged in a housing 39 which is attached to a pivot arm 35. Gears 42, the axes 43 of which are mounted rotatably in the bracing wheel or friction wheel 29, roll on the female tooth system 41. A shaft 45 mounted rotatably in the housing 39 which carries a male tooth system 44, and upon the section 46 of which the bracing wheel or friction wheel 29 is mounted rotatably, is driven via the gears 42. A disc 47 which is connected integrally in rotation to the shaft 45 carries a first coupling lining 48, which cooperates with a second coupling lining 49 which is arranged on the driving part 31, which is in turn mounted rotatably on a section 50 of the shaft 45. By virtue of the arrangement chosen, the driving part 31 is driven via the slip coupling formed by the coupling linings 48 and 49, and the gear formed by the ring gear 40, the gears 42 and the male tooth system 44 of the shaft 45, at a rotary speed which is greater than the rotary speed of the bracing wheel or friction wheel 29. The centrifugal forces exerted upon the chain strand groups 6 therefore attain the desired high values rapidly from the start.

Figures 11, 12:
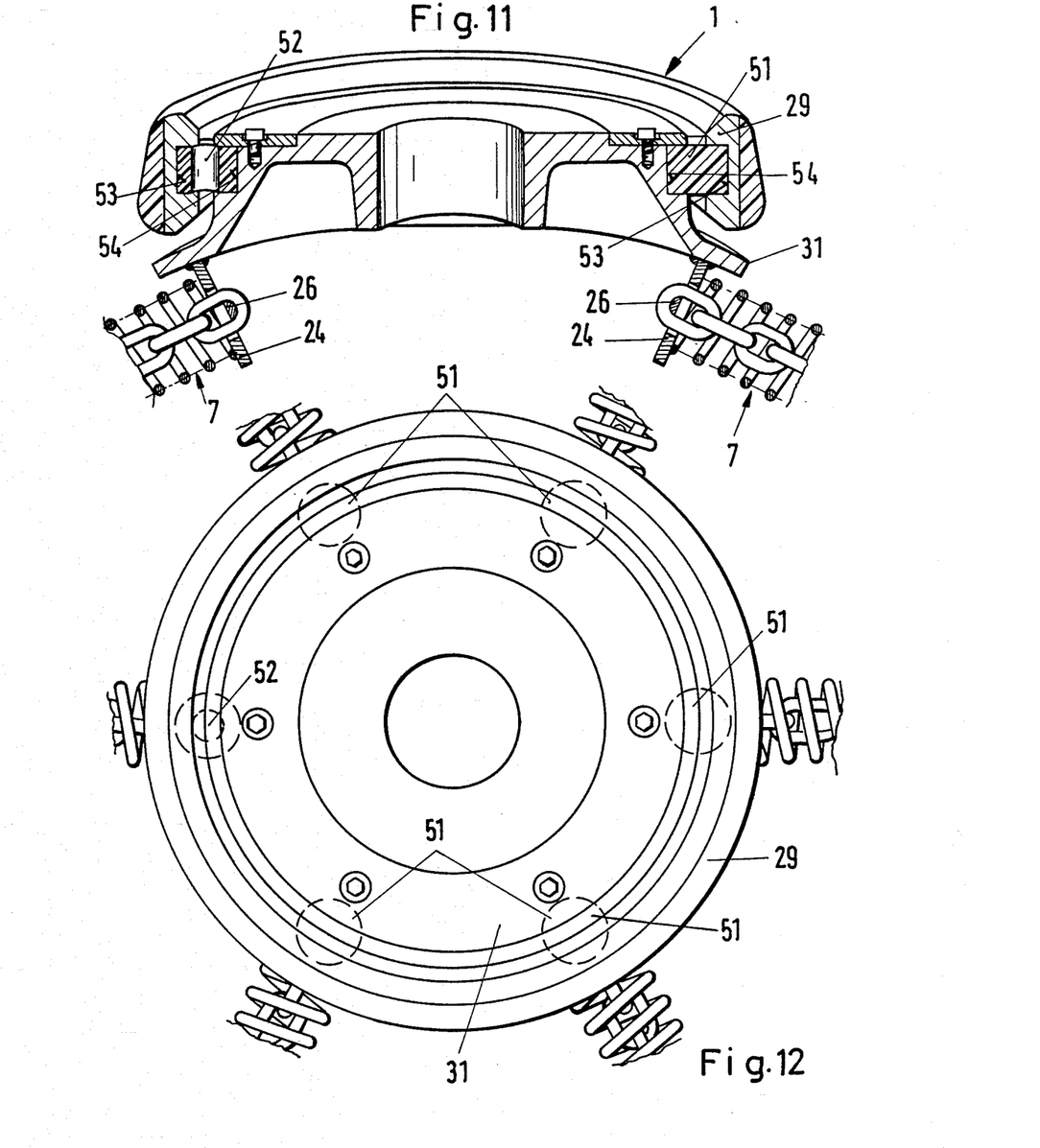
FIG. 11 shows a section through a modified support of an anti-skid device and FIG. 12 shows the plan of the support according to FIG. 11.

Finally, FIGS. 11 and 12 show a support, the bracing wheel or friction wheel 29 of which is braced against the driving part 31 by spring elements 51 and 52. The spring elements 51,52 of cylindrical or hollow cylindrical construction, which consist of a resilient material, are in this case braced by parts of their circumference in catch grooves 53,54 against the bracing wheel or friction wheel 29 and against the driving part 31. The spring elements, 51,52 consist of rubber or a similarly resilient plastic material and may assume the function of a slip coupling in addition to the springing function.

We claim:

1. Anti-skid device for motor vehicles with a plurality of chain strands (2, 3, 4, 5) retained by a support (1) which can be set into a revolving motion and connected to the latter by intermediate pieces (7) forming resilient spreading arms, of which the ends remote from the support (1) are thrown away from the support (1) by the effect of centrifugal force when the support (1) revolves in the service position, and at least parts of which pass through the region of the ground contact surface of the tyre (12) when the vehicle tyre (12) rotates, characterized in that chain strand groups, each of which groups comprises at least two chain strands, engage the outer ends of at least some of the intermediate pieces forming the resilient spreading arms, each of said intermediate pieces forming the resilient spreading arms supporting at least one of said plurality of chain strands at the outer end of said intermediate piece, and at least some of said intermediate pieces forming said resilient spreading arms supporting one of said chain strand groups comprising at least two of said plurality of chain strands at the outer end of said intermediate pieces, the number of said plurality of chain strands being greater than the number of said intermediate pieces.

2. Device according to claim 1, characterized in that chain strand groups (6) comprising at least two chain strands (2,3) engage each intermediate piece (7).

3. Device according to claim 1, characterized in that each chain strand group (6) comprises three to five chain strands.

4. Device according to claim 3, characterized in that each chain strand group (6) consists of three or four chain strands (2,3,4,5).

5. Device according to claim 1, characterized in that five to seven chain strand groups (6) are distributed uniformly over the circumference of a substantially plate-shaped support (1).

6. Apparatus according to claim 5, characterized in that six chain strand groups (6) are distributed over the circumference of the support (1).

7. Device according to claim 1, characterized in that the chain strands (2,3,4,5) of the chain strand groups (6) are of unequal length (FIG. 3, top).

8. Device according to claim 1, characterized in that the chain strands (2,3,4,5) of the chain strand groups (6) exhibit links (8,9) which are matched in size to the wedge gap (11) between vehicle tyre (12) and road (13), which is a function of the outside diameter of the vehicle tyre (12), so that they are retained in the wedge gap (11) by friction on a smooth road (13).

9. Device according to claim 8, characterized in that the tangent (14) oriented at right angles to the vehicle tyre axis to the bracing point (15) of a link (8,9) matched in size to the outside diameter of the vehicle tyre (12) forms an angle $\alpha_1$ to the road (13) which is smaller than 12°.

10. Device according to claim 1, characterized in that the links (8,9) of the chain strands (2,3,4, 5) of the chain strand groups (6) exhibit different dimensions, whilst the links (9) arranged at the free ends of the chain strands (2,3,4,5) have smaller dimensions than the links (8) located nearer the support (1) (FIG. 3, bottom).

11. Device according to claim 1, characterized in that the nominal thickness (d) of the links (8,9) of the chain strands (2,3,4,5) of the chain strand groups (6) is a maximum of 5 mm.

12. Device according to claim 1, characterized in that the outside width (b) of the links (8,9) is at most equal to three and a half times the nominal thickness (d).

13. Device according to claim 1, characterized in that the pitch (t) of the links (8,9) of the chain strands (2,3,4,5) is at most equal to four times the nominal thickness (d) of the links (8,9).

14. Device according to claim 1, characterized in that the intermediate pieces (7) assume an angle (B) of 40°–80° relative to the axis of rotation (17) of the support (1), said angle being measured in the direction of extension of said intermediate pieces away from said support.

15. Device according to claim 1, characterized in that the intermediate pieces (7) comprise chain strand sections (20) surrounded by resilient supporting means each formed by a spring (21) or a sleeve (22).

16. Device according to claim 15, characterized in that the resilient supporting means (21) are constructed as helicoidal springs, the turns of which assume a mutual interval.

17. Device according to claim 15, characterized in that the resilient supporting means (21) are constructed as compression springs pre-tensioned by the chain strand sections (20).

18. Device according to claim 15, characterized in that the support (1) is provided with abutments (24) for the ends of the springs (21) or sleeves (22) facing it.

19. Device according to claim 18, characterized in that the intermediate pieces (7) are anchored to the support (1) by releasable locking members (26).

20. Device according to claim 18, characterized in that the abutments (24) on the support side for the springs (21) or sleeves (22) exhibit bracing surfaces (25) oriented obliquely to the axis of rotation of the plate-shaped support (1) for the ends of the springs (21) or sleeves (22).

21. Device according to claim 15, characterized in that one end of each of the springs (21) or sleeves (22) is mounted non-tiltably on the support (1).

22. Device according to claim 15, characterized in that the intermediate pieces (7) are connected to the chain strands (2, 3, 4, 5) of the chain strand groups (6) by components which brace the abutment (27) for the ends of the springs (21) or sleeves (22) remote from the support (1).

23. Device according to claim 22, characterized in that the components connecting the intermediate pieces (7) to the chain strand groups (6) are constructed as rings (23).

24. Device according to claim 1 with a bracing wheel or friction wheel serving to introduce the revolving motion into the support, characterized in that the support (1) exhibits a driving part (31) mounted rotatably relative to the bracing wheel or friction wheel (29) for the chain strand groups (6), which is in communication with the bracing wheel or friction wheel (29) through a gear (40, 42, 44) which increases the rotary speed of the driving part (31) compared to the speed of the bracing wheel or friction wheel (29).

25. Device according to claim 24, characterized in that the gear (40,42,44) is constructed as an epicyclic gear.

26. Device according to claim 24, characterized in that the bracing wheel or friction wheel (29) is connected to the driving part (31) of the support (1) by spring elements (51,52) admitting limited radial movements.

27. Device according to claim 26, characterized in that the spring elements (51,52) project into catch grooves (53,54) on the internal surface of the bracing wheel or friction wheel (29) and on the external surface of the driving part (31) of the support (1).

28. Device according to claim 27, characterized in that the spring elements (51,52) project into the catch grooves (53,54) by a part of their circumference.

29. Device according to claim 26, characterized in that the spring elements (51,52) are of cylindrical or hollow cylindrical construction and comprise rubber or a similarly resilient plastic material.

30. Device according to claim 1, with a bracing wheel or friction wheel serving to introduce the revolving motion into the support, characterized in that the support (1) exhibits a driving part (31) mounted rotatably relative to the bracing wheel or friction wheel (29) for the chain strand groups (6), which is connected to the bracing wheel or friction wheel (29) by a slip coupling (36,37,38;48,49;51,52,53,54).

31. Device according to claim 30 and, characterized in that spring elements (51,52) form parts of the slip coupling.

* * * * *